April 22, 1969 HANS-JÜRGEN BROCKMANN 3,440,479

COLOR TELEVISION DISPLAY DEVICE

Filed June 7, 1967 Sheet 1 of 3

INVENTOR.
HANS JÜRGEN BROCKMANN
BY
Frank R. [signature]
AGENT

INVENTOR.
HANS JÜRGEN BROCKMANN
BY
Frank R. Trifari
AGENT

INVENTOR.
HANS JÜRGEN BROCKMANN
BY
AGENT

United States Patent Office 3,440,479

Patented Apr. 22, 1969

3,440,479

COLOR TELEVISION DISPLAY DEVICE

Hans-Jürgen Brockmann, Hamburg, Germany, assignor, by mesne assignments, to U.S. Philips Corporation, New York, N.Y., a corporation of Delaware Filed June 7, 1967, Ser. No. 644,326
Claims priority, application Germany, June 11, 1966, P 39,675; Sept. 2, 1966, P 40,320
Int. Cl. H01j *29/50*
U.S. Cl. 315—13 10 Claims

ABSTRACT OF THE DISCLOSURE

In a convergence circuit for a color television system, current is applied by way of a diode to the convergence coils during the last half of the deflection period. The current flow is integrated by the coils to form a substantially parabolic current. The stored energy produces an exponential current during the first half of the deflection period, and the amplitude of the exponential current is controlled by pulses applied to the coil during the fly-back period.

The invention relates to a color television image display device comprising a convergence circuit having a convergence correction coil connected to an output of a deflection current supply member through a unilaterally conducting circuit element, in which through the unilaterally conducting circuit element the convergence correction coil receives the periodical deflection current from said member for at least part of the second half period thereof, said current being integrated in the convergence correction coil to a substantially parabolic branch current. The current through this convergence correction coil dies out in a circuit connected to the convergence coil during the first half period of the deflection current, so that during this first half period an exponentially varying branch current through the convergence correction coil is obtained, which joins the parabolic current and which is substantially zero at the center of the deflection period.

In a color television image display system comprising a three-gun display tube it is necessary to apply a convergence correction in order to ensure satisfactory overlapping of the three color images.

From Dutch patent application 6,408,924 there is known a color television display device comprising a convergence correction circuit of the kind set forth. Such a device has, however, the disadvantage that it requires an additional sawtooth-like correction current for the adjustment of the relative amplitudes of the parabolic and the exponential branch currents. Due to this additional correction current, however, the adjustments of the convergence corrections on either side of the image center are dependent one upon the other and act one upon the other in opposite senses in the two halves of the image. Therefore, the convergence adjustment is complicated and time-consuming.

The invention has for its object to provide a simple convergence circuit, which avoids the aforesaid disadvantage.

According to the invention the periodical convergence correction currents are comprised only of said parabolic and exponential branch currents, while a periodical pulse is applied to the convergence coil through a unilaterally condducting circuit element during the fly-back time of the deflection. The amplitude of the exponential branch current can be adjusted by means of this pulse.

If in such a color television image display device according to the invention the convergence correction is first adjusted for the half of the image where the parabolic branch current is operative, after which the same is done in the half of the image where the exponential branch current is operative, a very simple adjustment of the convergence is obtained, while the second adjustment does not affect the first adjustment.

The invention will be described hereinafter with reference to the drawing, which shows a few embodiments.

In the various figures, parts having the same function are designated so that the last two digits of the reference numeral are the same.

FIG. 1 of the drawing shows in a basic diagram a frame frequency convergence correction circuit according to the invention, for example, for the red convergence correction coil.

Figure 1:
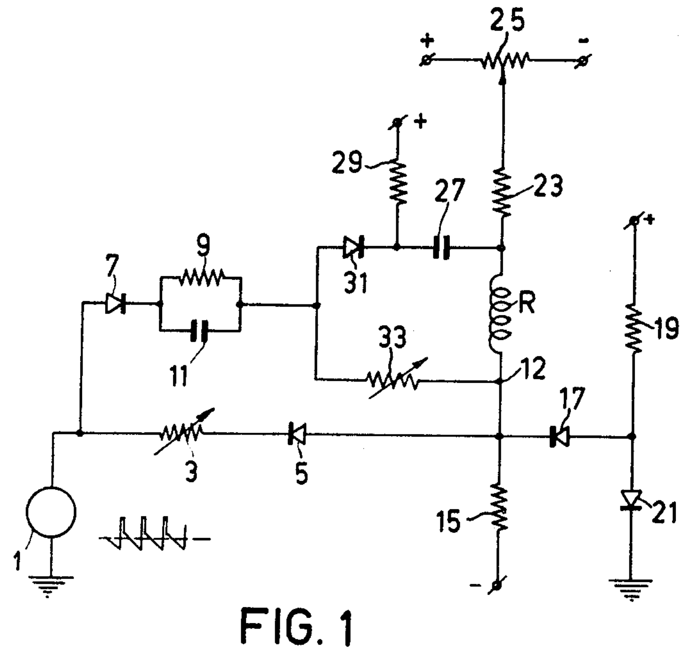

Referring to FIG. 1, reference numeral 1 designates a voltage source, forming the output of a vertical deflection current supply member of a color television display device (not shown), including the convergence correction circuit. The voltage source 1 supplies a periodical, sawtooth-like voltage going from positive to negative, for example and having, for example, positive pulses during the alternations from negative to positive.

This voltage is applied in the first place to the series combination of a resistor 3 and a diode 5 for obtaining the parabolic current through a convergence coil R during the second half of each scanned frame.

According to the invention said voltage is applied secondly to the series-combination of a diode 7 and a threshold voltage network, in order to obtain additional energy to ensure a correct amplitude of the oscillation in each first half of a frame. The threshold voltage network comprises the parallel-combination of a resistor 9 and a capacitor 11.

The series-combination of the resistor 3 and the diode 5 is connected to one end 12 of the convergence correction coil R. This end 12 is furthermore connected to a resistor 15 and to the cathode of a diode 17. The anode of the diode 17 is connected to one end of a resistor 19 and to the anode of a diode 21, whose cathode is connected to earth. The other end of the resistor 19 is connected to a positive supply voltage. The negative-going part of the sawtooth voltage of the source 1 is applied via the adjustable resistor 3 and the conducting diode 5 to the end 12 of the convergence correction coil R. Due to the integrating effect of the inductance of the coil R a current increasing substantially along a parabolic branch will pass through it. The amplitude of this current and hence the convergence correction in one half of the image is adjustable by means of the resistor 3. The current fed to the end 12 of the coil R passes through the coil R via a resistor 23 and an adjustable potentiometer 25 and furthermore through a capacitor 27, a resistor 29 and the voltage sources, to which the resistor 29 and the potentiometer 25 are connected, back to the source 1. During the negative-going part of the voltage of the source 1 the diodes 7 and 21 are cut off and the remainder of the arrangement does not play any part. During the positive-going and sawtooth-like part of the voltage of the source 1, which gradually decreases to zero, all diodes of the circuitry are cut off with the exception of the diodes 17 and 21. The energy accumulated in the coil R dies out and a decreasing current passes through the coil R in the same direction as that during the negative-going part of the sawtooth voltage of the source 1. The resistors 15 and 19 are proportioned so that the diodes 17 and 21 remain conducting when the current of the coil R is dying out. The end 12 of the coil R thus maintains substantially ground potential and the current through the correction coil R is fed on the other side from ground via supply sources and the series-connected resistor 29 and capacitor 27 and via the resistors 23 and 25.

Without the measure according to the invention the amplitude of the convergence correction current through the coil R during the first half of the sawtooth would be solely determined by that appearing during the second half. However, according to the invention a pulse is applied to the correction coil R at the polarity change of the sawtooth voltage of the source 1, so that the amplitude of the exponentially decreasing damping current through the coil R can be corrected during the first half of the sawtooth, said amplitude being thus independent of the amplitude of the parabolic current during the second half. As a result, the convergence adjustment in one image half is independent of that in the other image half, so that an easy adjustability of the convergence is obtained. The operation of the correction method according to the invention is as follows. The positive pulses appearing at the change of polarity of the sawtooth voltage of the source 1 are applied through the diode 7 and the network 9, 11 to a dividing member, which is connected via two branches to the ends of the convergence coil R. One branch of the dividing member is formed by a diode 31 and the capacitor 27. The diode 31 has its anode connected to the threshold voltage network 9, 11 and its cathode via the resistor 29 to a positive threshold voltage. The other branch of the dividing member is formed by a variable resistor 33. At the appearance of the positive voltage peak of the source 1 only the diodes 7 and 31 are conducting and a correction current is fed to the two ends of the convergence correction coil R via the branches of the dividing member. By adjusting the resistor 33 this current through the correction coil can be set in value and polarity, so that the amplitude of the exponentially decreasing damping current appearing during the first half of the sawtooth can be adjusted. If the current fed via the branch 31, 27 of the dividing member dominates, the amplitude of the exponential part will be increased, since then the energy accumulated in the coil R is reduced. The amplitude decreases, when the current fed via the branch 33 dominates, since then the energy accumulated in the coil R is decreased. The current fed through said branches of the dividing member is only operative during the appearance of the positive peaks of the voltage of the source 1, since only then the diodes 31 and 7 are conducting. During the positive voltage peaks the network 9, 11 is charged to a voltage such that the diode 7 remains cut off for the remaining period of time. The diode 5 is cut off during the said positive peaks and remains substantially cut off until the sawtooth voltage changes over from positive to negative.

Through the potentiometer 25 and the resistor 23 the convergence correction coil R also receives a static correction current, the adjustment of which does substantially not affect the dynamic properties of the arrangement, since owing to the aforesaid connection of the diodes 17 and 21 the current supply from the source 1 to the coil R invariably starts approximately at the image center.

The correction according to the invention by means of a pulse instead of the conventional sawtooth current derived from the cathode of the deflection voltage output tube provides the additional advantage that the cathode circuit of said output tube is no longer affected by the derivation of an additional convergence correction current, so that the deflection can be more easily linearized.

Figure 2:
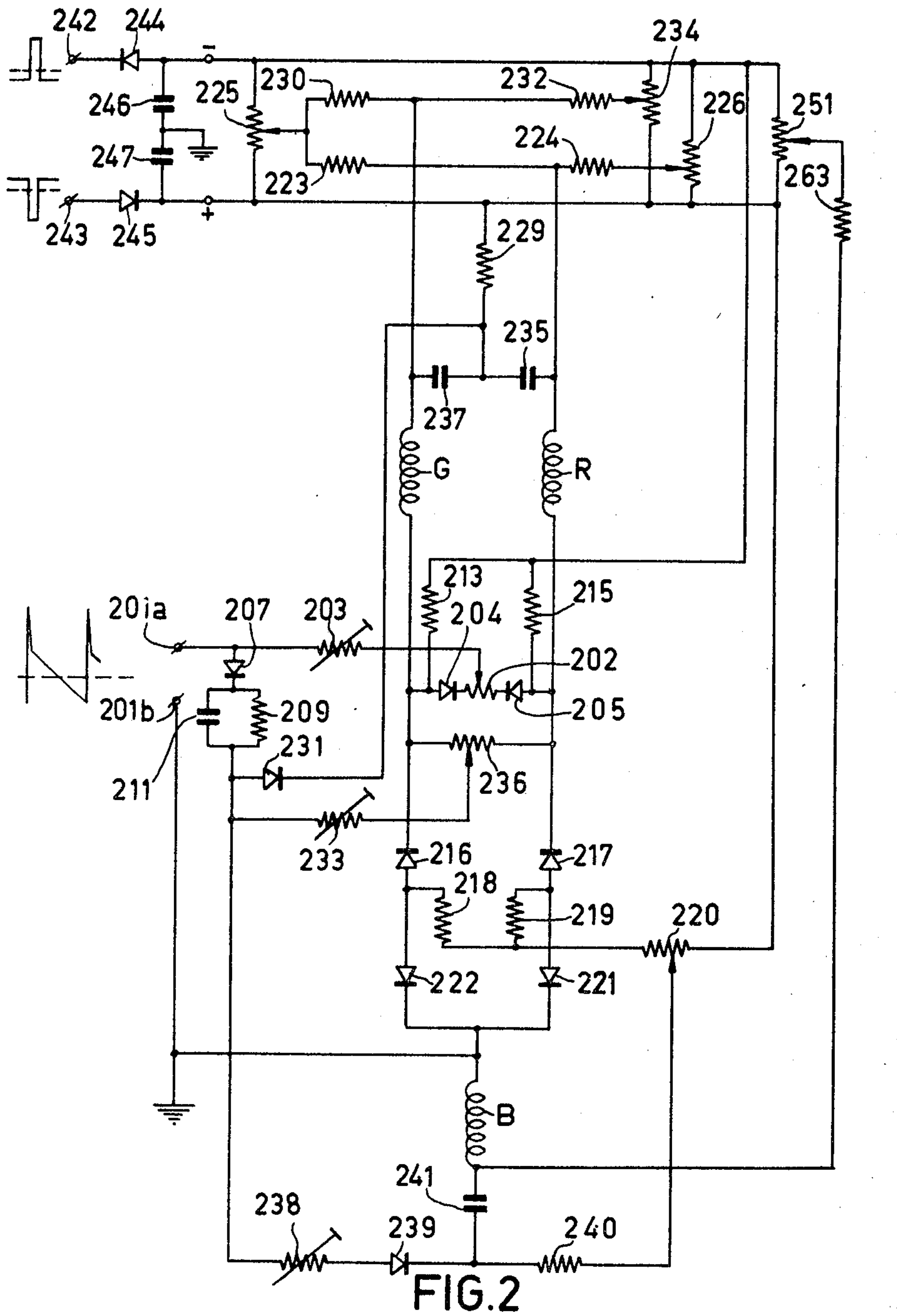
FIG. 2 shows in a basic diagram an embodiment of a frame-frequency convergence correction circuit according to the invention, in which the principle of the circuitry of FIG. 1 is carried into effect.

FIG. 2 shows convergence coils G, R and B of a three-gun tube of a color television display device. These coils are preferably connected to ground at one end, that is to say, the coil B is directly connected and the coils G and R are connected through a resistance network, from which the currents for the adjustment of the static convergence are derived, which will be explained more fully hereinafter. For alternating current the coils G and R are connected through capacitors 237 and 235 and via the resistance network to ground. In order to produce the dynamic convergence, that is to say the convergence depending upon the instantaneous value of the vertical deflection, the arrangement receives at the terminal **201*a* a voltage which drops from a positive value of about 4 v. in a sawtooth-like manner to approximately the same negative value and which has a high positive pulse during the fly-back period. The terminals 201*a* and 201*b*, the latter being connected to ground, may be connected to the secondary winding of a transformer in the output circuit of the frame output stage of a television receiver, forming the source 1** of FIG. 1.

During the second part of the forward stroke the diode 207 (Philips type BYX 10), whose anode is connected to the terminal **201*a*, is cut off and the negative voltage is applied through a variable resistor 203 of 100 ohms at the most to the sliding contact of a potentiometer 202 of, for example, 100 ohms, to the ends of which are connected the cathodes of two diodes 204 and 205 (Philips type BYX 10), whose anodes are connected to the ends of the windings G and R remote from the capacitors 237 and 235 respectively. The negative voltage increasing in a sawtooth-like manner is thus applied to said coils, in which it produces by integration a parabolically increasing current which provides the desired correction in the second part of the vertical deflection, that is to say in the lower part of the image. With the aid of the potentiometer 203 the amplitude of this parabolic current can be adjusted for the two convergence coils in common, while the parabolic amplitudes in the coils G and R can be differentiated by displacing the sliding contact of the potentiometer 202 with respect to the central position. The negative voltages at the anodes of the diodes 204 and 205 are applied to the cathodes of the diodes 216 and 217 (OA81) and via the anodes thereof and the resistors 218 and 219 of, for example, 68 ohms to the resistance path of a potentiometer 220, the other end of which is connected to a positive bias voltage of about 5 v. and connected for alternating current to ground. Therefore, the negative part of the applied sawtooth voltage also appears across the sliding contact of the potentiometer 220, from where it is applied through a series resistor 240 of, for example, 100 ohms and a separating capacitor 241 to the coil B, in which is thus produced by integration a parabolic correction current. The amplitude of this current can be varied by displacement of the sliding contact of the potentiometer 220**.

At the end of the forward stroke the parabolic correction currents through the coils G, R and B have attained a given maximum value. If the voltage at the terminals 201 then becomes zero again, the supply circuits are switched off and due to the magnetic energy accumulated in the coils an exponentially decreasing current appears, whose extent of decay is determined by the inductance L of each convergence coil and by the resistance of the external circuitry. The time constant of this decrease is proportioned so that the descending current curve approaches to the optimum the desired parabolic variation. A time constant of 4 msec. with a vertical scanning period of 20 msec. provides a satisfactory result.

When the negative voltage across the coils G, R and B disappears during the fly-back, the current still increasing at the end of the forward stroke changes into a decreasing current, and the voltage across the coils R, G and B changes its polarity. In the external circuitry all resistance branches, including also in particular elements of the D.C. adjusting network of FIG. 1, are operative for the decreasing current. No difficulties will arise in correctly proportioning these circuit elements. If necessary, parallel and/or series resistors might be provided for the coils G, R and B.

For an accurate control of the convergence correction it is desirable that the amplitudes of the branches of the correction current curve in the first and in the second parts of the forward stroke can be made different. As stated above, according to the invention the adjustment of the correction amplitude is obtained at the beginning of the deflection interval by the variation of the current value produced by the pulsatory part of the control-voltage. During this part of the positive voltage the diodes 204 and 205 are cut off, whereas the diode 207 becomes conducting. To the cathode of the latter is connected the RC-network formed by the capacitor 211 and the resistor 209 of, for example, 100 $\mu$f. and 1200 ohms respectively across which a bias voltage appears which exceeds the maximum value of the positive part of the sawtooth voltage proper, so that the diode 207 is conducting solely during the pulsatory part of the fly-back. The pulsatory voltage allowed to pass is applied on the one hand to the anode of a diode 231 (BYX 10), the cathode of which is connected to the junction of the capacitors 237 and 235, and through a resistor 229 of, for example, 150 ohms, to a positive bias voltage source. Moreover, the passed voltage pulse is applied through a variable resistor 233 of, for example, 500 ohms, to the sliding contact of a potentiometer 236 of, for example, 250 ohms, the ends of which are connected to the coils G and R. During the fly-back interval the two ends of the coils G and R thus receive for a short time a high positive voltage so that the accumulated magnetic energy and hence the value of the correction current at the beginning of the forward stroke are increased or decreased. The degree of this control and hence the direction and the amplitude of the correction current at the beginning of the forward stroke, that is to say, in the upper part of the image, can be adjusted for the coils G and R in common by means of the resistor 233, while different amplitudes for these coils can be obtained by the displacement of the sliding contact of the resistor 236.

According to the invention the positive pulse is also applied via a variable resistor 238 to the anode of a diode 239 (OA81), the cathode of which is connected through the separation capacitor 241 to the coil B; in this way the amplitude correction of the current at the beginning of the forward stroke is obtained in this coil.

The arrangement shown comprises furthermore a network for producing auxiliary D.C. deflection fields for the static correction of the convergence. For this purpose positive and negative line pulses are applied through the terminals 242 and 243 to the cathode and the anode respectively of the diodes 244 and 245 respectively (BYX 10), the anode and the cathode of which respectively are connected to otherwise earth-connected capacitors 246 and 247 of, for example, 250 $\mu$f. each respectively. In this case it is not the pulse parts appearing during tha fly-back but it is the basic parts of the applied voltage during the forward stroke that are rectified. Direct voltages of −5 v. and +5 v. to earth are obtained. Between these voltages are connected potentiometers 225, 234, 226 and 251 of, for example, 1000 ohms each. These potentiometers are comparable with the potentiometer 25 of FIG. 1. The sliding contacts of the potentiometers 225 and 234, and 225 and 226 respectively are interconnected via the series combinations of two resistors 230, 232 and 223, 224 respectively of, for example, 270 ohms each. The junction of the resistors 230 and 232, 223 and 224 to the coil G and the coil R respectively are connected to the capacitors 237 and 235 respectively. The negative terminal is furthermore connected through resistors 213 and 215 of, for example, 560 ohms each to the other ends of the coils G and R. The positive terminal is connected through the resistor 220 and the resistors 218 and 219 to the diodes 216 and 217, which are conducting in the absence of an opposite voltage, so that the resistors 218, 213 and 219, 215 respectively from two potentiometers connected to the battery voltages, to the tappings of which are connected the coils G and R. The anodes of the diodes 216 and 217 are furthermore connected to the anodes of diodes 222 and 221, the cathodes of which are connected to ground. These diodes are cut off, when negative voltages are applied to the coils G and R during the second part of the forward stroke, after having been joined across the resistors 218 and 219 to a single negative voltage, these voltages are applied to the potentiometer 220 and to the coil B. If during the first part of the forward stroke after the fly-back with the decreasing currents through the coils G and R positive voltages appear, which do not cut off the diodes 216 and 217 owing to the negative bias current supplied through the resistors 213 and 215, the positive voltage of the coils G and R is transferred to the diodes 222 and 221, which are then conducting and thus form a ground connection.

For the static convergence adjustment a direct current is supplied to the coil B from the sliding contact of the potentiometer 251 through a resistor 263 of, for example, 270 ohms.

In the arrangement shown particularly the effect of the diodes 216 and 217, 222 and 221 results in that the branches of the correction currents, which may be parabolic, are substantially zero at the center of the forward stroke and hence also geometrically at the center of the image. Therefore, the static convergence correction to be set in this region is substantially completely independent of the adjustment of the dynamic convergence correction, so that in a simple manner an optimum over-all correction can be obtained rapidly and reliably.

It is preferred to arrange all adjusting potentiometers both for the dynamic and the static convergence settings at one place near one another in the color television receiver. If this place is located near the front, the adjustment can be carried out by direct observation of the display tube without the need for using a mirror or the like. It is efficacious to arrange the adjusting means beneath a cover plate so that the user cannot change the adjustment unintentionally.

Figure 3:
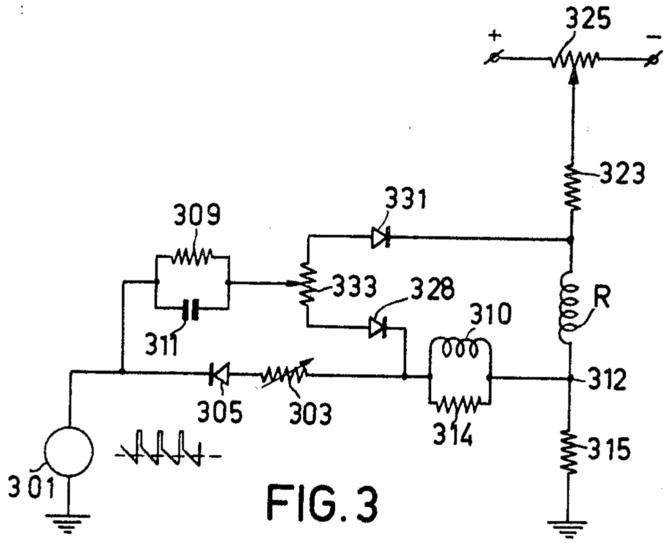
FIG. 3 shows in a basic diagram a further frame-frequency convergence correction circuit according to the invention, in which in the second half of the image also the shape of the correction current is adjustable independently of the adjustment in the other half, for example, for the red convergence correction coil.

Referring to FIG. 3, reference numeral 301 designates the output of a frame deflection current supply member of a color television receiver (not shown), in which the convergence correction circuit shown in said figure is included. The source 301 supplies the periodical, sawtooth-like voltage varying from positive to negative and having positive pulses at the changeover from the end of the negative to the beginning of the positive part of the sawtooth. This voltage is applied to the series combination of a diode 305 and a variable resistor 303 and to the parallel-combination of a resistor 309 and a capacitor 311, serving as a charging network. The series combination of the diode 305 and the resistor 303 is connected through a saturable inductor 310 to one end 312 of the convergence correction coil R. The saturable inductor 310 is shunted by a resistor 314. The end 312 of said coil R is connected to ground through a resistor 315. The other end of the coil R is connected via a resistor 323 to an adjustable tapping of a potentiometer 325, connected between a positive and a negative source. The connection of the coil R to the resistor 323 is linked through a diode 331 to one end of a potentiometer 333. The other end of said potentiometer is connected via a diode 328 to the junction of the inductor 310 and the resistor 303. The tapping of the potentiometer 333 is connected to the network 309, 311. The potentiometer 333, together with the diodes 331 and 328, constitutes a member for dividing the pulses applied via the network 309, 311 from the source 301 to the ends of the coil R. This will be referred to again in the description of the operation of the arrangement.

The arrangement operates as follows. During the second half of the sawtooth from the source 301, when the voltage is negative, the diode 305 is conducting. Via the resistor 303 and the parallel combination of the saturable inductor 310 and the resistor 314 a negative current is supplied to the end 312 of the coil R. Owing to the integrating effect of the inductor 310 and the coil R this current has a parabolic waveform. According to the invention the inductance of inductor 310 varies with the current and decreases in value with an increasing current strength so that the parabolic current increase occurs more rapidly than in the case of a constant inductance in the current circuits. For many convergence correction circuits the resultant strong curvature of the parabolic is desired. This curvature may be adjusted to an advantageous form by a correct choice of the ratio between the inductor 310 and the resistor 314.

During the negative part of the sawtooth from the source 301 the diodes 331 and 328 are cut off. At the end of the negative part of the sawtooth the polarity of the voltage of the source 301 changes over, so that the diode 305 is cut off. The current passing through the coil R dies out exponentially during the positive part of the sawtooth of the source 301 through the resistors 315, 323 and 325. The resistor 315 has a low value so that the voltage at the end 312 of the coil R remains at a level such that the beginning of the current supply via the diode 305 remains substantially at the center of the image. Through the resistor 315, 323 and the potentiometer 325 a direct current can, in addition, be passed through the coil R for the static convergence correction. This current does not substantially affect the dynamic properties of the circuitry, so that the point of taking current remains substantially unchanged. Without the measure according to the invention the amplitude of the current during the first half of the sawtooth would be determined, when dying out, by the amplitude of the current passing through the coil R at the end of the second half of the sawtooth. The latter amplitude is variable by means of the adjustable resistor 303. The convergence correction in the second half of the image is therefore adjustable in this manner. According to the invention the amplitude of the current during the first half of the sawtooth is independent of the amplitude in the second half, which can thus be corrected by applying a pulse to the coil R during the change-over from the negative to the positive part of the sawtooth voltage of the source 301. For this purpose a positive peak voltage is applied by the source 301 during the fly-back of the time base through the network 309, 311 and the dividing member 333, 331, 328 to the two ends of the coil R. The diodes 331 and 328 are conducting only during this peak voltage, since the capacitor 311 forms a threshold voltage, which slightly exceeds the peak value of the sawtooth voltage of the source 301. By means of the dividing member 333, 331, 328 the additional current provided by the peak voltage through the coil R can be adjusted in value and polarity, so that an increase or a decrease of the amplitude of the convergence correction current during the first half of the image can be obtained as desired with respect to that in the second half of the image. By means of the potentiometer 333 the amplitude of the current through the coil R is, during the first half of the image independent of that during the second half of the image. As stated above, the waveform of the current through the coil R in the second half of the sawtooth can be acted upon independently of that in the first half means of a saturable inductor 310 and the parallel-connected resistor 314. Therefore, the arrangement provides an adjustability for the individual halves of the image, while its construction is fairly simple.

Figure 4:
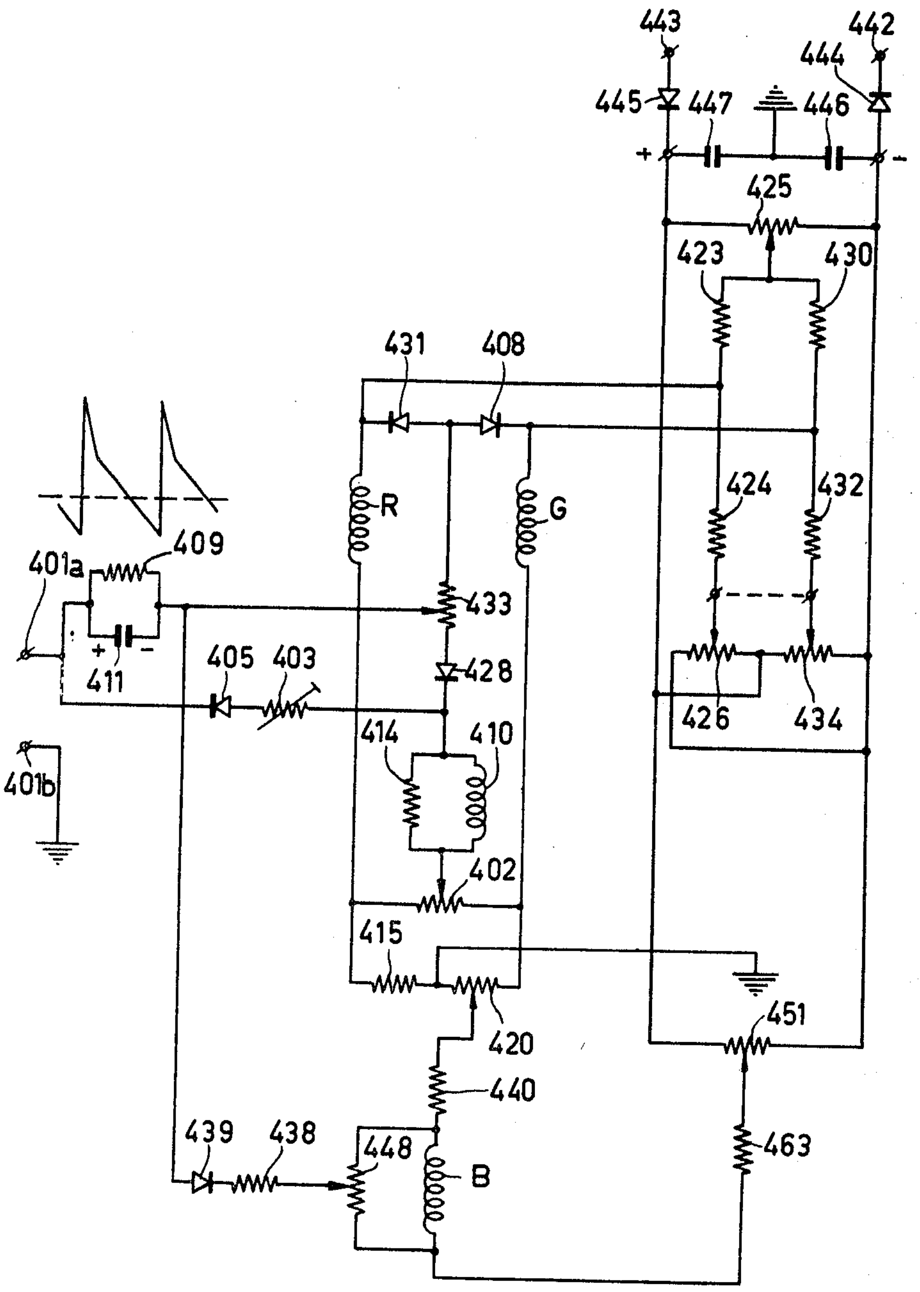
FIG. 4 shows in a basic diagram one embodiment of a frame-frequency convergence correction circuit in which the principle of the circuitry of FIG. 3 is applied.

Referring to FIG. 4, reference R, G and B designate convergence correction coils.

In a color television receiver it is necessary to apply a convergence correction circuit in order to ensure accurate overlap of the three color images. In a display tube comprising three electron guns and having a common line and frame deflection this overlap is usually obtained only near the center of the image, if no special percautions are taken. A static correction by means of permanent or electro-magnets is not sufficient; the correction of the green, red and blue frame requires additional deflection coils R, G and B associated with the electron beams.

These coils are preferably connected unilaterally through sufficiently low impedances to ground.

As is shown in the drawing the coils R, G and B are connected to earth through resistance networks, from which currents for the adjustment of the static convergence are derived, which will be described in detail hereinafter.

In order to obtain the dynamic convergence, that is to say, the convergence depending upon the instantaneous value of the beam deflection, a voltage of vertical deflection frequency is applied via terminal **401*a***. This sawtooth voltage decreases from a positive value of about 7 v. to an approximately equal value of about −9 v. and during the fly-back of the vertical deflection period it has a high positive pulse of, for example, +50 v. to +60 v.

Through an RC-circuit formed by a resistor 409 of 1.2 K ohms and a parallel-connected capacitor 411 of, for example, 100/$\mu$f. the terminal **401*a* is connected to the sliding contact of a potentiometer 433 of, for example, 500 ohms. The ends of the potentiometer 433 are connected on the one hand to the anodes of diodes 431 and 408 and on the other hand to the anode of the diode 428 (OA 81). The cathodes of the diodes 431 and 408 are connected to the ends of the coils R and G (shown upwards in the figure), which are furthermore connected to the resistance network shown in the right hand of FIGURE 4. On the other hand the RC-circuit 411, 409 is connected to the anode of a diode 439 (OA 81), the cathode of which is connected through a resistor 438 of, for example, 150 ohms, to the sliding contact of a potentiometer 488, which is connected in parallel with the coil B. The coil B is connected through a resistor 463 of, for example, 120 ohms, to the tapping of a potentiometer 451 of, for example, 1 K ohm, associated with the network for static convergence adjustment and on the other hand through a resistor 440 of e.g. 120 ohms to the tapping of a potentiometer 420. The ends of the coils R and G (shown downwards in the figure) are connected via the resistance path of a potentiometer 402 e.g. 100 ohms and furthermore through series-connected resistors 415 and 420 of e.g. 100 ohms each. The junction of the resistors 415 and 420** is connected to ground.

During the second negative part of the forward stroke the diodes 431, 408, 428 and 439 are cut off. The voltage of the terminal **401*a* is then applied to the cathode of a diode 405. The diode 405 is then conducting and the voltage applied to the cathode is derived from its anode through an adjustable resistor 403 of e.g. 100 ohms, said voltage being applied to a coil 410, having a current-dependent inductance, included in accordance with the invention. The other end of the coil 410 is connected to the tapping of the potentiometer 402. The coil 410 has a resistance value of e.g. 12 ohms and an inductance of 0.7 h. at a minimum current. At the maximum current at the end of the forward stroke the coil 410 is strongly saturated and exhibits at its ends substantially only the voltage drop corresponding to its ohmic resistance. For the adjustment and the correction a resistor 414 of e.g. 180 ohms, which may be variable, is connected in parallel with the coil 410. The negative voltage is applied particularly via the coil 410 to the lower ends of the coils R and G, so that a current is produced by the integration of the voltage. This current also traverses the coil 410, whose inductance varies with this current and hence also with the current passing through the resistors 415 and 420. As a result also the voltage drop across the coil 410 diminishes with an increasing current so that the voltage across the coils R and G increases accordingly. The integrated current at the end of the forward stroke interval has therefore a higher steepness than in the absence of the coil 410** and than could be obtained with a constant value of the inductance in the integrating branch.

The higher voltage to be integrated also appears across the resistor 420, so that it also affects the current obtained by integration through the coil B.

Since in accordance with the invention correction of the steepness of the correction current can be obtained in a simple manner, the disadvantages involved in the use of ohmic resistors such as 403, 440 and 402 can be avoided, which resistors adversely affect the integration. However, these ohmic resistors are usually indispensible for the adjustment and the coupling between the correction circuits.

By means of the resistor 403 the amplitude of the correction current in the second part of the deflection interval can be adjusted in common for the two coils R and G, while by the displacement of the tapping of the potentiometer 402 with respect to the central position the amplitude of the current passing through the coils R and G can be differentiated. The amplitude for the coil B is controlled by the adjustment of the tapping of the potentiometer 420.

At the end of the forward stroke the parabolic correction currents through the coils, R, G and B have reached a given maximum value. If the negative voltage disappears from the terminal 401*a*, the integrating supply circuits are switched off and owing to the magnetic energy accumulated in the coils an exponentially decreasing current is produced, which is particularly determined by the inductances $L_R$, $L_G$ and $L_B$ of the coils R, G and B respectively and the resistances of the external circuitry, while the voltages across the coils R, G and B changes its polarity. The time constants of said decreases are proportioned so that the descending current curves approach to the optimum the desired, substantially parabolic course. A time constant of 4 mec. with a vertical scanning period of 20 msec. provides a satisfactory result. The sawtooth voltage at the terminal 401*a* is inoperative in this first part of the next-following forward stroke subsequent to the second part of the forward stroke, since the RC-circuit 411, 409 is at a voltage which is negative with respect to the terminal 401*a* and which has a value exceeding the maximum positive value of the sawtooth portion of the applied voltage. Since the voltage at the terminal 401*a* is positive, the diode 405 is cut off. Owing to the bias voltage of the RC-circuit 411, 409, the voltage at the anodes of the diodes 431, 408, 428, 439 is negative so that also these diodes are cut off.

In the first part of the forward stroke all conductive resistance branches are operative in the external circuitry for the dying-out current, particularly also the element of the network shown on the right-hand side in the figure for the D.C. control. These circuit elements can be proportioned easily. If desired, further resistors may be connected in parallel or in series with the coils R, G and/or B.

For an accurate control of the convergence correction it is desired for the branches of the correction current in the first and in the second part of the forward stroke to have different amplitudes.

According to the invention the adjustment of the correction amplitude at the beginning of the deflection interval is obtained by means of the current variation through the coils R, G and B produced during the fly-back by the pulsatory portion of the control-voltage. During this part of higher positive voltage the diode 405 is cut off, whereas the diodes 431, 408, 428 and 439 are conducting. The capacitor 411 is charged and a voltage is produced, which is negative to the terminal 401*a* at the right-hand end of the capacitor 411, connected to said diodes; the value of this voltage exceeds slightly the optimum positive value of the sawtooth part of the applied voltage.

Therefore, the branches connected to the RC-circuit 411, 409 are traversed by current only during the pulsatory part of the fly-back. The pulsatory voltage thus separated out is applied on the one hand via the diodes 431 and 408 to the upper ends of the coils R and G and on the other hand via the diode 428 and the potentiometer 402 to the lower ends. Together with the resistors connected between said ends of the coils and ground bridge circuits are formed so that by a displacement of the tapping of the potentiometer 433 or 448 respectively during the fly-back a pulsatory current can be supplied to the coils, the amplitude and polarity of which current are adjustable. Therefore, the magnetic energy accumulated in the coils R, G and B during the fly-back interval can be increased or decreased, so that the value of the correction current at the beginning of the forward stroke is also varied accordingly.

The arrangement shown comprises furthermore a network (shown on the right-hand side in the figure) by means of which auxiliary D.C. deflection fields for the static correction of the convergence can be obtained. For this purpose positive and negative pulses respectively, derived for example from the horizontal-deflection voltage transformer are applied via the terminals 442 and 443 to the cathode and the anode of the diodes 444 and 445 respectively (BYX 10), whose anode and cathode respectively are connected to otherwise ground-connected capactiors 446 and 447 of 100/$\mu$f. each. It is not the pulse portions but it is the basic parts of the applied voltages that are rectified. This results in direct voltages of about −5 v. and +5 v. to ground. Between these voltages are connected potentiometers 425, 434, 426 and 451 of, for example, 1000 ohms each. The tappings of the potentiometers 425 and 434 and of 425 and 426 are interconnected through the series combination of two resistors 430, 432 and 423, 424 respectively of, for example, 330 ohms each. The junctions of these resistors are connected to the junction of the coil G and the diode 408 and the junction of the coil R and the diode 431.

For the adjustment of the static convergence for the coils R and G in common the tapping of the potentiometer 425 is adapted to slide. For the different adjustments the tappings of the potentiometers 434 and 426 are displaceable in opposite senses so that the voltage at one tapping is higher while the voltage at the other is lower. The potentiometers are connected in the manner shown in FIG. 4 in opposite senses to the voltage, while their tappings are mechanically coupled.

For the static convergence adjustment a current variable in value and polarity is supplied from the tapping of the potentiometer 451 through a resistor 463 of e.g. 120 ohms to the coil B. The direct voltages produced by the static convergence adjustment approximately at the center of the deflection period at the potentiometers and hence across the resistors 415 and 420 provide such a bias voltage of the diode 405, that this does not become conducting exactly at the zero passage of the sawtooth voltage. The bias voltage, which may be 0.7 v. at the most, is, however, low due to the chosen low values of the resistors 415 and 420 as compared with the voltage of the negative half of the sawtooth and it appears only when the tappings of the potentiometers 425 and 451 have to be turned out of their central positions due to the tolerances of the display tube. Since owing to the peaks of fly-back pulses the zero passage usually lies about 3 mesc. prior to the end of the forward stroke and since otherwise a given voltage (about 1 v.) is required for rendering the diode 405 conducting, a shift of about 2 msec. is left. This left shift is strictly necessary, since shortly before the center of the period the current through the diode 405 has to start because for the center of the image and during the first half according to an *e*-function decreasing current through the convergence coils R, G and B is compensated.

The coils R, G and B have in this example resistance values of 170 ohms and an inductance of 1.9 h.

Since the branches of the correction voltages are derived from part of the sawtooth voltage at the terminal 401*a*, that is to say from the second part of the forward stroke and are applied to the coils R, G and B with an amplitude-true coupling without the use of members cutting off the D.C. component such as transformers or capacitors, a kind of clamping of the correction currents is obtained, so that approximately at the center of the image, when the dynamic convergence correction is at a minimum and approximately zero the correction depends only upon the adjusted (static) (D.C.) convergence.

In the arrangement shown it is thus ensured that the branches of the parabolic correction currents are substantially zero at the center of the forward stroke of the image and hence also geometrically at the center of the image. Therefore, the static convergence correction to be adjusted particularly in said region is completely independent of the adjustment of the dynamic convergence correction, so that in a simple manner an optimum over-all correction can be adjusted rapidly and accurately.

All variable potentiometers, both for the dynamic and for the static convergence adjustment, are preferably arranged near each other at one place in the receiver. If this place is located near the front, the adjustment can be carried out by direct observation of the tube without the need for using a mirror or the like. It may be efficacious to cover the controls by a plate in order to prevent unintentional change of the adjustment.

From the stabilized voltages of the capacitors 446 and 447 a current can be derived for the adjustment of the image position; like in the convergence adjustment said current is quite independent of main voltage fluctuations. Instead of using direct currents derived from the terminals 442, 443 for the static convergence adjustment, permanent magnets may be employed in known manner; then the coils R, G and B have to be connected through appropriate fixed resistors to the reference point (ground).

Although in these embodiments diodes are used as unilaterally conducting circuit elements, it is obvious that also transistors may be employed for the supply of the correction currents to the convergence coils.

It is furthermore possible to use the aforesaid circuitry for line-frequency convergence correction. Then, however, the correction pulse has to be derived, in general, from a different point of the deflection stage or via a differentiating network.

What is claimed is:

1. A convergence correction circuit for a color television display system, comprising a convergence correction coil, a source of periodic deflection currents and pulses which occur during the flyback time of said deflection currents, first unidirectional conducting means, means connected to apply said deflection currents to said coil by way of said first unilateral conducting means whereby said coil receives current from said source by way of said first unidirectional conducting means at least during the second half periods of said deflection current and the current flow in said coil during said second half periods is integrated by said coil to have a substantially parabolic waveshape, discharge circuit means connected to said coil to dissipate energy stored therein during said second half periods whereby an exponentially varying current flows in said coil during the first half periods of said deflection currents and the flow of periodically varying current in said coil is substantially zero at the centers of said periods, second unilateral conducting means, and means connected to apply said pulses to said coil by way of said second unilateral conducting means for controlling the amplitude of said exponentially varying current.

2. The correction circuit of claim 1 wherein said means connected to apply said pulses to said coil comprises means for controlling the amplitude and polarity of said pulses applied to said coil.

3. The correction circuit of claim 1 wherein said deflection currents and pulses appear at common terminals of said source, and said means connected to apply said pulses to said coil comprises a parallel resistor-capacitor circuit connected as a threshold device.

4. The correction circuit of claim 1 wherein said means connected to apply said pulses to said coil comprises first and second paths connected to apply said pulses to opposite ends of said coil, at least one of said paths comprising an adjustable impedance for controlling the relative amplitude of pulses applied to opposite ends of said coil.

5. The correction circuit of claim 1 wherein said means for applying said deflection currents to said coil comprises saturable inductor means.

6. The corrections circuit of claim 1 comprising a source of direct current, and means including at least a part of said discharge circuit connected to apply said direct current to said coil for static convergence correction.

7. The correction circuit of claim 1 wherein said source has first and second terminals, and said deflection currents and pulses are both applied to said first and second terminals, comprising resistive circuit means connecting one end of said coil to said first terminal, said means connected to apply said deflection currents to said coil comprises first resistor means, and means serially connecting said first unidirectional conducting means between said second terminal and the other end of said coil, and said means applying said pulses to said coil comprises a network including a parallel resistance-capacitance circuit, means connecting one end of said parallel circuit to said second terminal, and first and second path means for connecting the other end of said parallel circuit to said one and said other ends of said coil respectively, at least one of said path means including a variable resistance, said second unilateral conducting means being connected in series in said network whereby said pulses are applied to both ends of said coil.

8. The correction circuit of claim 7 wherein said second unidirectional conducting means comprises a separate diode connected in series in each of said first and second paths.

9. The correction circuit of claim 7 wherein said second unidirectional conducting means comprises a diode connected in series with said parallel circuit between said second terminal and said first and second paths.

10. The correction circuit of claim 7 comprising a source of direct current, and means including said resistor circuit means connecting said source of direct current to said coil for providing static convergence correction.

References Cited

UNITED STATES PATENTS

| | | | |
|---|---|---|---|
| 3,163,797 | 12/1964 | Singleback. | |
| 3,375,398 | 3/1968 | Ohlhorst | 315—13 |

RODNEY D. BENNETT, Jr., *Primary Examiner.*

M. F. HUMBLER, *Assistant Examiner.*